United States Patent
Zhang et al.

(10) Patent No.: US 7,706,269 B2
(45) Date of Patent: Apr. 27, 2010

(54) METHOD, SYSTEM AND DEVICE FOR CONTROLLING A TRANSMISSION WINDOW SIZE

(75) Inventors: Dongmei Zhang, Beijing (CN); Runtong Zhang, Beijing (CH); Jian Ma, Beijing (CN); Zhigang Kan, Beijing (CN)

(73) Assignee: Nokia Corporation, Espoo (FI)

( * ) Notice: Subject to any disclaimer, the term of this patent is extended or adjusted under 35 U.S.C. 154(b) by 1103 days.

(21) Appl. No.: 10/503,563

(22) PCT Filed: Mar. 22, 2002

(86) PCT No.: PCT/IB02/00871

§ 371 (c)(1),
(2), (4) Date: Aug. 3, 2004

(87) PCT Pub. No.: WO03/081873

PCT Pub. Date: Oct. 2, 2003

(65) Prior Publication Data

US 2005/0088972 A1     Apr. 28, 2005

(51) Int. Cl.
*H04J 1/16* (2006.01)
(52) U.S. Cl. .......... 370/232; 370/231; 370/235
(58) Field of Classification Search .......... 370/231, 370/232, 235
See application file for complete search history.

(56) References Cited

U.S. PATENT DOCUMENTS

| 5,912,878 | A  | * | 6/1999 | Park et al. ............... 370/229 |
| 6,075,989 | A  | * | 6/2000 | Moore et al. ............. 455/436 |
| 6,219,713 | B1 | * | 4/2001 | Ruutu et al. ............. 709/235 |
| 6,704,571 | B1 | * | 3/2004 | Moon ..................... 455/436 |
| 7,187,666 | B1 | * | 3/2007 | Farley et al. ............ 370/331 |
| 7,236,796 | B2 | * | 6/2007 | Soliman .................. 455/456.1 |
| 2002/0034947 | A1 | * | 3/2002 | Soliman ................. 455/436 |
| 2003/0092392 | A1 | * | 5/2003 | Komandur et al. ...... 455/67.1 |

FOREIGN PATENT DOCUMENTS

| EP | 0 948 168 A1 | 10/1999 |
| WO | 96/36150 | 11/1996 |
| WO | 00/45613 | 8/2000 |

OTHER PUBLICATIONS

Hari Balakrishnan, et al., "Improving reliable transport and handoff performance in cellular wireless networks," Dec. 1995, p. 469-481.

* cited by examiner

*Primary Examiner*—Jason E Mattis
(74) *Attorney, Agent, or Firm*—Alston & Bird LLP

(57) ABSTRACT

A method and system for controlling a transmission window size, wherein a transmission condition of the transmission path between a transmitting element and a receiving element is checked when at least one of the transmitting and receiving elements moves from a first access network to a second access network. Then, the transmission window size is changed in response to the result of said checking step. Thereby, the transmission window can be decreased actively to thereby accelerate the control procedure and improve resource utilization.

16 Claims, 2 Drawing Sheets

METHOD, SYSTEM AND DEVICE FOR CONTROLLING A TRANSMISSION WINDOW SIZE

FIELD OF THE INVENTION

The present invention relates to a method and system for controlling a transmission window size in a packet data transmission between a first network node and a second network node, as for example the control of a congestion window size or an advertised window size in a Transmission Control Protocol (TCP) transmission.

BACKGROUND OF THE INVENTION

The Internet network layer service (Internet Protocol Service) is unreliable. IP does not guarantee datagram delivery, in-order delivery of datagrams, and integrity of the data in the datagrams. In IP services, datagrams can overflow router buffers and never reach their destination, datagrams can arrive out of order, and bits in the datagram can get corrupted.

TCP creates a reliable data transfer service on top of IP's unreliable best-effort service. Many popular application protocols use TCP rather than UDP (User Datagram Protocol) primarily because TCP provides reliable data transfer service.

Retransmission of lost and corrupted data is crucial for providing reliable data transfer. TCP provides reliable data transfer by using positive acknowledgements and timers, wherein data that has been received correctly is acknowledged, and packet data units or segments are retransmitted when they or their corresponding acknowledgements are thought to be lost or corrupted. Moreover, TCP uses pipelining, allowing the sender to have multiple transmitted but yet-to-be-acknowledged segments outstanding at any given time. Pipelining can greatly improve the throughput of a TCP connection when the ratio of the segment size to round trip delay is small. The number of transmitted but unacknowledged segments that a sender can have is determined by TCPs flow control and congestion control mechanisms.

According to TCP congestion control, a TCP connection controls its transmission rate by limiting its number of transmitted but yet-to-be-acknowledged segments. This number of permissible unacknowledged segments is often referred to as TCP window size w. Ideally, TCP connections should be allowed to transmit as fast as possible, i.e. to have as large a number of outstanding unacknowledged packets as possible, as long as segments are not lost (dropped at routers) due to congestion. In very broad terms, a TCP connection starts with a small value of w and then "probes" for the existence of additional unused link bandwidth at the links on its end-to-end path by increasing w. A TCP connection continues to increase w until a segment loss occurs, as detected by a timeout or duplicate acknowledgements. When such a loss occurs, the TCP connection reduces w to a "safe level" and then begins probing again for unused bandwidth by slowly increasing w.

An important measure of the performance of a TCP connection is its throughput, i.e. the rate at which it transmits data from the sender to the receiver. Clearly, the throughput will depend on the value of w. If a TCP sender transmits all w segments back-to-back, it must then wait for one round trip time (RTT) until it receives acknowledgements for these segments, at which point it can send w additional segments. If a connection transmits w segments of a maximum segment size (MSS) by every RTT seconds, then the connections throughput, or transmission rate, is (w×MSS)/RTT bytes per second.

The TCP congestion control mechanism has each side of the connection keep track of two additional variables, the congestion window and a threshold.

Once a TCP connection is established between the two end-systems, the application process at the sender provides bytes to the senders TCP send buffer. TCP grabs portions of size MSS, encapsulates each portion within a TCP segment, and passes the segments to a network layer for transmission across the network. The TCP congestion window regulates the times at which the segments are sent into the network. Initially, the congestion window is equal to one MSS. TCP sends the first segment into the network and waits for an acknowledgement. If this segment is acknowledged before its timer times out, the sender increases the congestion window by one MSS and sends out two MSSs. If these segments are acknowledged before their timeouts, the sender increases the congestion window by one MSS for each of the acknowledged segments, giving a congestion window of four MSS, and sends out four MSSs. This procedure continues as long as the congestion window is below the threshold and the acknowledgements arrive before their corresponding timeouts. During this phase of the congestion control procedure, the congestion window increases exponentially, i.e. the congestion window is initialized to one MSS, after one RTT the window is increased to two segments, after two RTTs the window is increased to four segments, after three RTTs the window is increased to eight segments, etc. This phase of the algorithm is called slow start because it begins with a small congestion window equal to one MSS. The slow start phase ends when the window size exceeds the threshold value. Once the congestion window is larger than the current threshold value, the congestion window grows linearly rather than exponentially. This has the effect of increasing the congestion window by one in each RTT for which an entire windows worth of acknowledgements arrives. This phase of the algorithm is called congestion avoidance.

The congestion avoidance phase continues as long as the acknowledgements arrive before their corresponding timeouts. But the window size and hence the rate at which the TCP sender can send, cannot increase forever. Eventually, the TCP rate will be such that one of the links along the path become saturated, and point loss and a resulting timeout at the sender will occur. When a timeout occurs, the threshold value is set to half a value of the current congestion window, and the congestion window is reset to one MSS. The sender then again grows a congestion window exponentially fast using the slow start procedure until the congestion window hits the threshold.

The congestion window imposes an additional constraint on how much traffic a host can send into a connection. Specifically, the amount of unacknowledged data that a host can have within a TCP connection may not exceed the minimum of the congestion window and an advertised window indicating the number of bytes that a receiver is willing to accept. To achieve this, according to a window pacing method, the receiver sends acknowledgement packets including window advertisement data for informing the transmitter of the capacity of the receiver to handle incoming data. Thus, the receiver can signal to the transmitter a suitable window size (i.e. the advertised window) for flow control purposes. In practice, the advertised window specifies how many additional units of data the receiver is prepared to accept. The transmitter then compares the advertised window to the congestion window and adjusts its congestion window according to the size of the advertised window, unless the congestion window maintained by the transmitter is smaller. In principle, both the congestion window and the advertised window can be used to adjust the transmission rate of the transmitter.

Document U.S. Pat. No. 6,219,713 discloses a method and apparatus for adjusting a TCP sliding window with information about network conditions. An underlying network is enabled to use the receiver's window advertisements carried in the acknowledgement packets for controlling the transmission speed of a TCP source. To achieve this, a specific device or network functionality, i.e. a Feedback Information Converter (FIC) is introduced. The FIC includes a function for receiving accepted packet discarding priority levels carried by received data packets. When the FIC knows the nominal bit rate of the TCP source, it can calculate a TCP transmission window size required to keep the priorities of the data packets just greater than or equal to the accepted priority level. Then, the FIC put this calculated window size to the acknowledgement packet instead of the original receiver's advertised window.

Mobility support for Internet devices is quite important, since mobile computing is getting more widespread. It is expected that the number of mobile computers will increase immensely. Furthermore, there are already first products of cellular phones offering IP services. Cellular devices of the $3^{rd}$ generation will be packet switched devices instead of circuit switched, therefore IP services on $3^{rd}$ generation cellular devices will be an integral part in the future.

To support mobile devices, which dynamically change their access points to the Internet, the Internet Engineering Task Force (IETF) currently standardizes a protocol supporting mobile Internet devices, called mobile IP. There are two variations of mobile IP, mobile IPv4, based on IPv4, and mobile IPv6, based IPv6. Further details regarding IPv6 can be gathered from the IETF specification RFC 2460.

Mobile IPv6 enhanced mobility will enable seamless handover between heterogeneous access networks. IP telephony or such services will become seamless even in heterogeneous access environments. However, when handovers occur in such environment, some applications such as Web browse and file transfer which use TCP as transport protocol will become problems or their performance will deteriorate. In particular, TCP is a reliable and robust transport protocol tuned for networks with consistent access media. The "consistent access media" means that the bandwidth and/or data rates of a terminal device (mobile or fixed node) accessing the Internet remains stable or relatively stable. This condition might be challenged in the mobile IPv6 networks. When a mobile node performs a handover from one access medium, e.g. a Wireless Local Area Network (WLAN), to another access medium, e.g. a Wideband Code Division Multiple Access (WCDMA) Network, the bandwidth and/or data rate of the mobile node may dramatically change, e.g. from a few megabytes to tens or hundreds of kilobytes. If the mobile node performs the handover from such a high-speed access network to such a low-speed access network and if the mobile node still keeps its original trends of transmission data rate, it would block the access node or make the access node congested. On the contrary, if the mobile node performs a handover from a low-speed access network to a high-speed access network, the access capacity may be underutilized. In addition, whenever a mobile node performs a handover from a CDMA cell with less/more subscribers (other mobile node) to another CDMA cell with more/less subscribers, its access bandwidth will also be no longer "consistent".

SUMMARY OF THE INVENTION

It is therefore an object of the present invention to provide a method and system for improving adaptation speed of a TCP connection in an instable network environment.

This object is achieved by a method of controlling a transmission window size, e.g. the size of a congestion window or an advertised window, in a packet data transmission between a transmitting element and a receiving element, said method comprising the steps of:

checking a transmission condition of the transmission path between said transmitting and receiving elements, when at least one of said transmitting and receiving elements moves from a first access network to a second access network; and changing said transmission window size in response to the result of said checking step.

Furthermore, the above object is achieved by a transmission system for controlling a transmission window size in a packet data transmission, said system comprising:

a transmitting element arranged for transmitting said packet data using a first transmission window size, e.g. the size of a congestion window; and a receiving element arranged for receiving said transmitted packet data;

wherein said receiving element is adapted to check a transmission condition of the transmission path between the transmitting and receiving elements, when said receiving element moves from a first access network to a second access network, to change a second transmission window size, e.g. the size of an advertised window, in response to the checking result, and to signal said second transmission window size to said transmitting element; and wherein said transmitting element is arranged to control said first transmission window size based on said signaled second transmission window size.

Additionally, the above object is achieved by a device for controlling a transmission window size in a packet data transmission, said device being arranged to check a transmission condition of the transmission path when said device moves from a first access network to a second access network, and to change said transmission window size in response to the checking result.

According to an advantageous further embodiment, the checking step is performed at the receiving end of the transmission path, and the changed transmission window size is signaled to the transmitting end. In particular, the changed transmission window size may be carried in a packet receipt acknowledgement message.

The transmission window may be a congestion window or an advertised window.

Accordingly, only minor modifications to the TCP software are required in mobile terminals to implement the window size control, while no modification at all is required in the intermediate routers of the packet data network. Due to the adaptation of the window size to the transmission conditions at the access network, enhanced TCP performance can be achieved for mobile nodes in heterogeneous access environments. Moreover, other TCP implementations are not affected, i.e. the window size control procedure according to the present invention is compatible with all other TCP implementations.

Preferably, the checking step may be performed on the basis of a handover signaling used for performing a handover between said first and second access networks.

The transmission condition may comprise at least one of a transmission bandwidth, a transmission delay, and a buffer capacity of the second access network.

The device may be a receiving element arranged to signal the transmission window size to a transmitting element.

Alternatively, the device may be a transmitting element arranged to perform the packet data transmission using the transmission window size.

In particular, the device may be a mobile node.

Further advantageous developments can be gathered from the dependent claims.

BRIEF DESCRIPTION OF THE DRAWINGS

In the following, the present invention will be described on the basis of a preferred embodiment with reference to the accompanying drawings, in which.

DESCRIPTION OF THE PREFERRED EMBODIMENT

The preferred embodiment will now be described on the basis of a TCP connection between a mobile node, such as a terminal device or user equipment 1, and another network node or element at the other transmission end of a packet data network.

Figure 1:
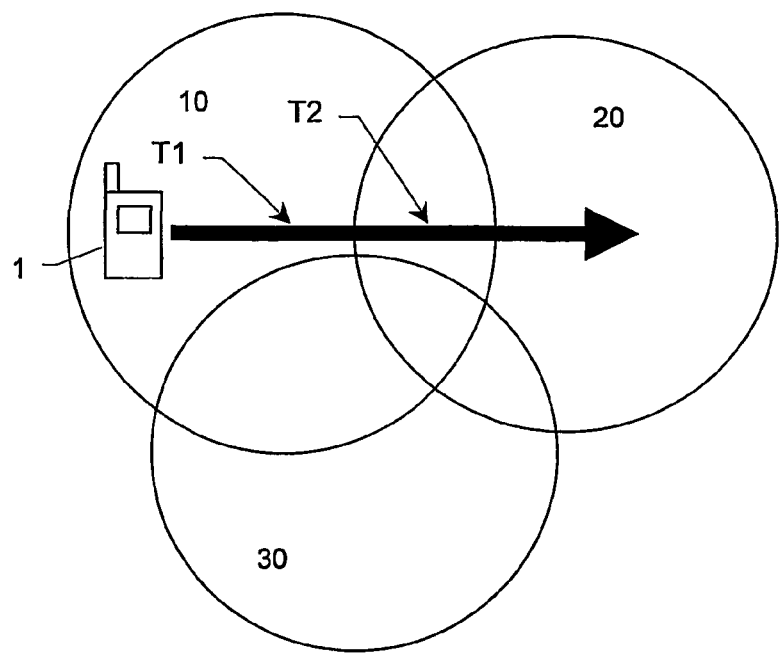
FIG. 1 shows a network architecture in which a handover is performed between two access networks.

According to FIG. 1, the mobile node 1 moves along a path indicated by the bold arrow. The mobile node is presently located within the coverage area of a first radio access network 10 and moves towards a second radio access network 20, while passing near a third radio access network 30. In the present invention, an access network or access medium may be any medium, by means of which the mobile node 1 can be connected to the fixed packet data network, e.g. an IP network. In the present case, the access network 10 may be a WLAN having a bandwidth or data rate of a few megabytes per second, while the second radio access network 20 may be a WCDMA network having a bandwidth or data rate of a few hundreds of kilobytes.

At a point T1 in FIG. 1, the mobile node 1 becomes aware of the two access networks 20 and 30 based on e.g. the broadcast signaling received from a base station or another access point. Then, the mobile node 1 analyses its movement and determines the second radio access network 20 as a potential network for handover. At a later point T2, a handover operation is initiated either by the second access network 20 or by the mobile node 1 according to a conventional handover proceeding. Based on the broadcast or handover signaling received from the second access network 20, the mobile node 1 determines transmission condition parameters, such as bandwidth, delay, buffer size and the like of the second access network 20, and is in a position to adjust its TCP transmission window size to match the changed conditions. Thus, the sending or receiving access rate for the mobile TCP sender or receiver can be adjusted in the presence of a change between heterogeneous access media, e.g. based on a handover operation. In such a situation, two scenarios may occur, i.e. the mobile node 1 may be a TCP receiver or a TCP sender.

If the mobile node 1 is a TCP receiver, it actively changes the advertised window size based on the changed transmission conditions in the second access network 20, when a handover between the first access network 10 and the second access network 20 is going to happen. The advertised window size is carried in the acknowledgement (ACK) message send to the TCP sender, and the TCP sender will accordingly adapt its sending rate according to the minimum value of the received advertised window size and the congestion window size determined at the TCP sender.

In the second scenario, the mobile node 1 is a TCP sender. The maximum size of the congestion window maintained at the mobile node 1 is actively changed based on the detected changes in the transmission condition of the second access network 20, when a handover between the first access network 10 and the second access network 20 is going to happen. The sender at the mobile node 1 will then adapt its sending rate according to the minimum of the advertised window size received from the TCP receiver at the other transmission end and the own congestion window size, wherein a congestion window size less or equal the maximum size of the congestion window is selected.

As a further advantage, utilization of network resources can be improved due to the fact that an under-utilization of access capacity can be prevented.

Figure 2:
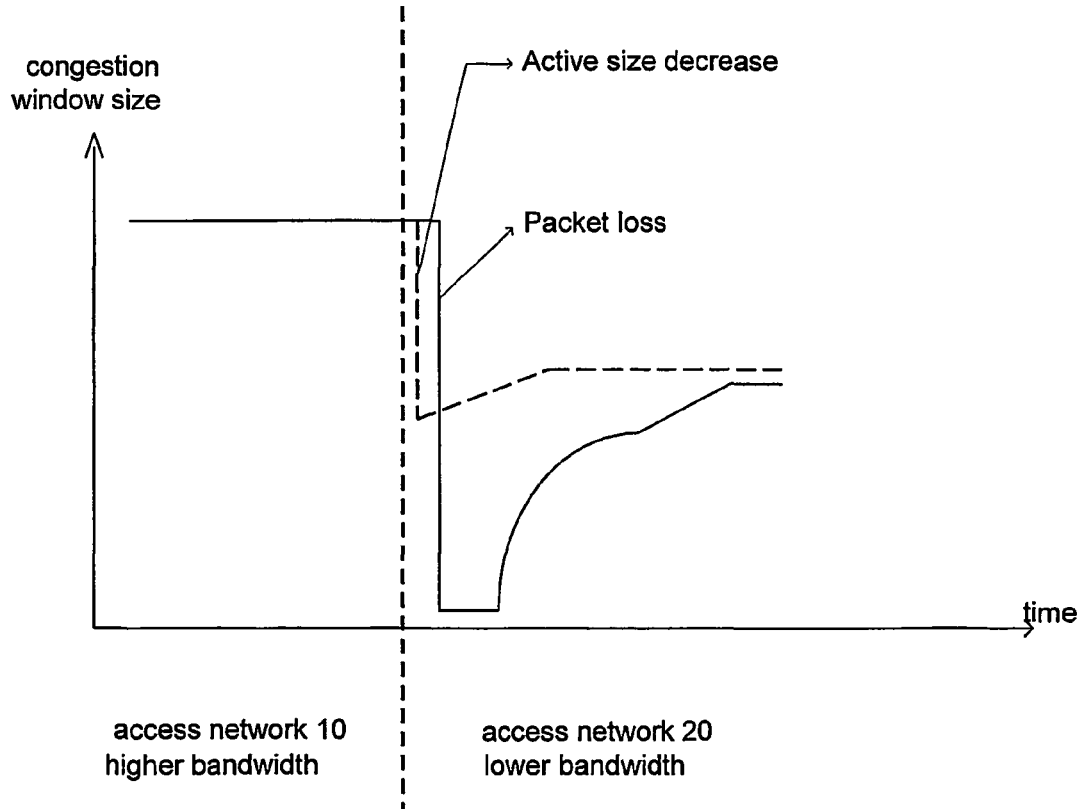
FIG. 2 shows a diagram indicating the behaviors of a congestion window in response to a handover from an original medium with higher access rate to a new medium with lower access rate with and without the method according to the preferred embodiment.

FIG. 2 shows a diagram indicating a time-dependent behavior of the congestion window size in the TCP sender of the mobile node 1, wherein a comparison of the behaviors of the congestion window in response to a handover of the mobile node 1 from the original access network 10 with higher access rate to the new access network 20 with lower access rate with and without the procedure according to the preferred embodiment are compared. In particular, the vertical dotted bold line indicates a border between the access network 10 with higher bandwidth and the access network 20 with lower bandwidth, at which the handover takes place. The dotted graph indicates the active decrease in the congestion window size based on the detected change in the transmission condition or a corresponding decrease in the window size of an advertised window received from the receiving end. The continuous line indicates a conventional reaction to a packet loss due to the excessive transmission rate in the access network 20 with the lower bandwidth. As indicated by the continuous line and mentioned in the introductory portion, the congestion window is substantially decreased to a size corresponding to one MSS (Maximum Segment Size) and then climbs exponentially fast during the slow start until its hits the threshold, from which on it climbs linearly until it reaches an adequate size.

In contrast thereto, according to the preferred embodiment, the congestion window size is adjusted based on the determined transmission conditions of the second access network 20 to a size close to the optimum size. Thus, the adjustment process can be accelerated and packet loss can be prevented. As a result, transmission reliability and resource utilization is improved.

Figure 3:
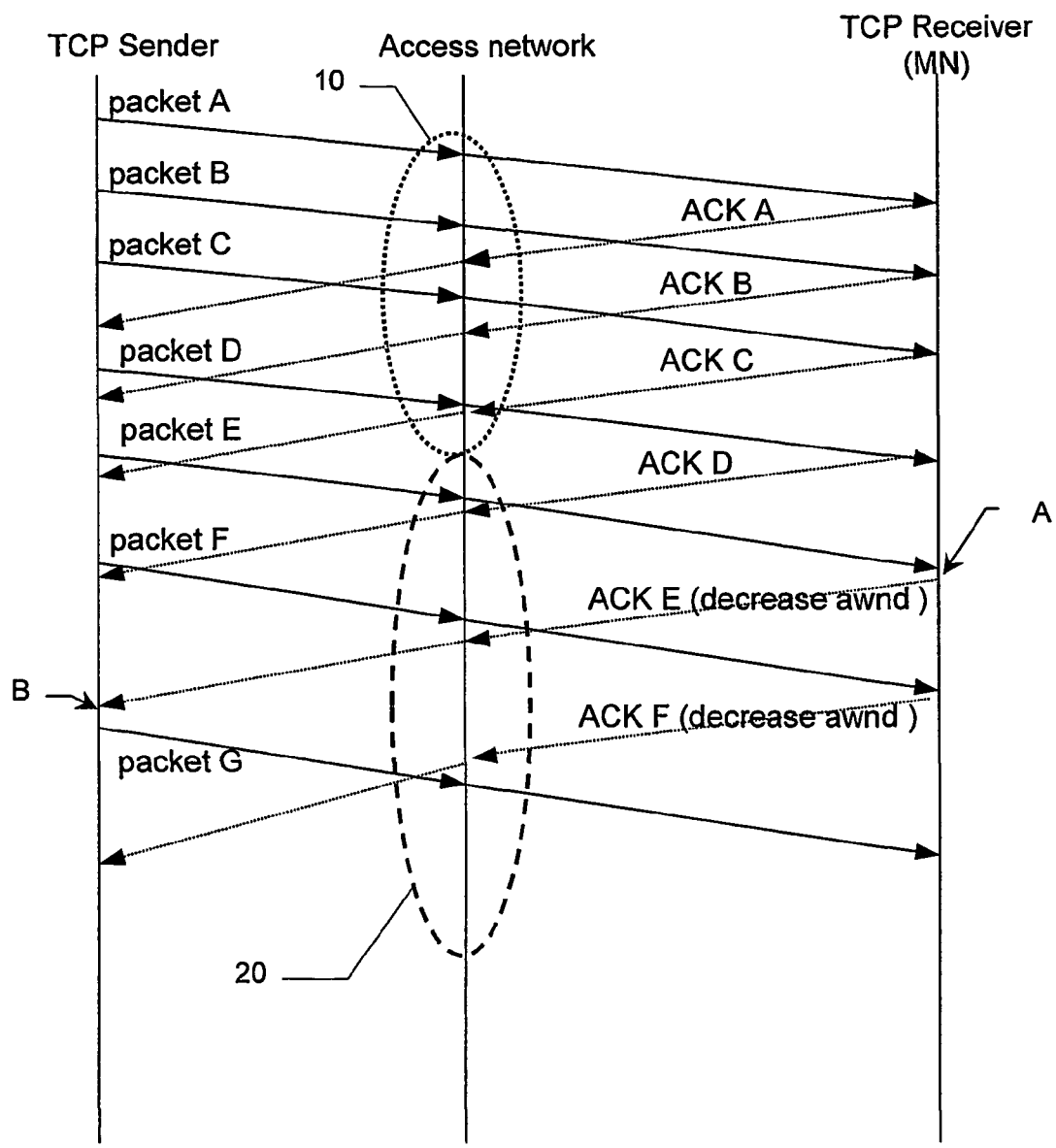
FIG. 3 shows a signaling diagram indicating packets and acknowledgements transmitted between a TCP sender and a TCP receiver according to the preferred embodiment.

FIG. 3 shows a signaling diagram indicating the transmission of packets A to G between a TCP sender and a TCP receiver, which in the present case is the mobile node 1. It is noted that the vertical axis corresponds to the time axis. According to FIG. 3, the packets A to D and the acknowledgements ACK A to ACK C are routed through the first access network 10 with the high bandwidth. Then, after the handover operation, the packets E to G and the acknowledgements ACK D to ACK F are routed through the second access network 20 with the lower bandwidth. As can be gathered from FIG. 3, when the packet E is received at the mobile node 1, the mobile node 1 changes the window size awnd of the advertised window based on the transmission conditions in the second access network 20 and sets the changed window size awnd in a corresponding information field in the acknowledgement message ACK E to be transmitted to the TCP sender. This point in time is indicated by "A" in the diagram of FIG. 3.

When the TCP sender receives the acknowledgement message ACK E with the decreased window size awnd, it changes its congestion window size used for the transmission operation according to the minimum of the received advertised window size awnd and its own maintain congestion window size. The corresponding point in time is indicated by "B" in the diagram of FIG. 3. Due to the fact that the congestion window size is now decreased at the TCP sender, the transmission rate is adequately reduced, as indicated in FIG. 2, and the risk of data losses due to buffer overflows in the network routers can be reduced.

According to the present invention, the transmission or congestion window can be changed actively based on the determined change in the transmission condition or based on an advertised window. As an example, the window size may be changed based on, e.g. proportional to, the bandwidth of the access network. More specifically, a window size corresponding to 50 packets may be selected for an access network with a bandwidth of 10 Mbps. Then, when the receiving node moves to an access network with a smaller bandwidth of 2 Mbps, the window size may be decreased to a size corresponding to 10 packets. Thus a decrease of the congestion window to one segment is not required during a move from one access medium to another access medium. However, it is noted that the window size may be changed or controlled based on any suitable network parameter indicating a transmission condition of the transmission path.

The procedure according to the preferred embodiment described above can be implemented in any packet data receiver or sender with slight modifications to the corresponding control software embedded. In particular, the mobile node 1 can be any mobile equipment, such as a mobile phone, a PDA, a laptop or the like. The present invention can be implemented in any data transmission having a congestion or flow control scheme based on a transmission window. It is noted that the present invention is not restricted to the particular features of the preferred embodiment, but can be varied within the scope of the attached claims.

The invention claimed is:

1. A method comprising:
    receiving, at a mobile node, a signaling indicating a handover of the mobile node from a first access network having a first access rate to a second access network having a second access rate, the second access rate being lower than the first access rate;
    determining, in response to receipt of the signaling, that the second access rate is lower than the first access rate;
    decreasing a transmission window size at the mobile node in response to the determination; and
    signaling, by the mobile node, the decreased transmission window size to a remote node in an acknowledgement message.

2. A method according to claim 1, wherein the mobile node is at a receiving end of a transmission path between the mobile node and the remote node such that the mobile node receives one or more packets transmitted by the remote node over the transmission path.

3. A method according to claim 2, wherein the acknowledgement message comprises a packet receipt acknowledgement message sent to the remote node to acknowledge receipt of a packet transmitted by the remote node.

4. A method according to claim 1, wherein said transmission window comprises a congestion window or an advertised window.

5. A method according to claim 2, wherein the one or more packets transmitted by the remote node over the transmission path are transmitted in accordance with transmission control protocol (TCP).

6. A method according to claim 1, wherein determining that the second access rate is lower than the first access rate comprises determining at least one of a transmission bandwidth, a transmission delay, or a buffer capacity of said second access network.

7. A method according to claim 1, wherein the first and second access rates are determined based at least in part upon one or more of a bandwidth, delay, or buffer size, and wherein the second access network has one or more of a different bandwidth, delay, or buffer size than a respective one or more of a bandwidth, delay, or buffer size of the first access network.

8. A method according to claim 1, wherein determining that the second access rate is lower than the first access rate comprises determining the second access rate and comparing the second access rate to the first access rate.

9. A transmission system comprising:
    a transmitting element configured to transmit packet data using a first transmission window size; and
    a receiving element configured to receive said transmitted packet data, wherein the receiving element comprises a mobile node;
    wherein said receiving element is configured to receive a signaling indicating a handover of the receiving element from a first access network having a first access rate to a second access network having a second access rate, the second access rate being lower than the first access rate, to determine that the second access rate is lower than the first access rate in response to receipt of the signaling, to decrease a second transmission window size at the receiving element in response to the determination, and to signal said second transmission window size to said transmitting element in an acknowledgement message; and
    wherein said transmitting element is configured to control said first transmission window size based on said signaled second transmission window size.

10. A system according to claim 9, wherein said transmitting element is configured to, when said transmitting element moves from a first access network to a second access network, determine whether the second access network has a lower access rate than the first access network and to control said first transmission window size based on the determination.

11. A system according to claim 9, wherein said first transmission window size comprises the size of a congestion window and said second transmission window size comprises the size of an advertised window.

12. A system according to claim 9, wherein said receiving element is configured to determine that the second access rate is lower than the first access rate at least in part by determining the second access rate and comparing the second access rate to the first access rate.

13. A system according to claim 9, wherein the first and second access rates are determined based at least in part upon one or more of a bandwidth, delay, or buffer size, and wherein the second access network has one or more of a different bandwidth, delay, or buffer size than a respective one or more of a bandwidth, delay, or buffer size of the first access network.

14. An apparatus comprising a mobile node comprising at least one memory storing computer program code, the stored computer program code configured to, when executed, cause the apparatus to at least:

receive a signaling indicating a handover of the apparatus from a first access network having a first access rate to a second access network having a second access rate, the second access rate being lower than the first access rate;

determine, in response to receipt of the signaling, that the second access rate is lower than the first access rate;

decrease a transmission window size in response to the determination; and provide for signaling the decreased transmission window size to a remote node in an acknowledgement message.

15. A method comprising:

causing receipt of a handover signaling used for performing a handover of at least one of a transmitting element or a receiving element between a first access network and a second access network when the at least one of the transmitting element or the receiving element moves from the first access network to the second access network;

checking, in response to receipt of the handover signaling, a transmission condition of a transmission path between the transmitting and receiving elements over the second access network following the handover;

comparing the checked transmission condition to a previous transmission condition for a previous transmission path between the transmitting and receiving elements over the first access network prior to the handover to determine whether the checked transmission condition comprises a changed transmission condition; and changing a transmission window size in a packet data transmission between said transmitting element and said receiving element when the checked transmission condition comprises a changed transmission condition.

16. An apparatus comprising at least one memory storing computer program code, the stored computer program code configured to, when executed, cause the apparatus to at least:

receive a handover signaling used for performing a handover of the apparatus between a first access network and a second access network when the apparatus moves from the first access network to the second access network;

checking, in response to receipt of the handover signaling, a transmission condition of a transmission path between the apparatus and a remote device over the second access network following the handover;

comparing the checked transmission condition to a previous transmission condition for a previous transmission path between the apparatus and the remote device over the first access network prior to the handover to determine whether the checked transmission condition comprises a changed transmission condition; and changing a transmission window size in a packet data transmission between the apparatus and the remote device when the checked transmission condition comprises a changed transmission condition.

\* \* \* \* \*